United States Patent
Merrell et al.

(10) Patent No.: US 6,609,187 B1
(45) Date of Patent: Aug. 19, 2003

(54) METHOD AND APPARATUS FOR SUPPORTING RESIZING OF FILE SYSTEM PARTITIONS

(75) Inventors: Alan Merrell, Fremont, CA (US); Joseph Altmaier, Riverside, IA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/350,272

(22) Filed: Jul. 6, 1999

(51) Int. Cl.[7] .............................................. G06F 12/00
(52) U.S. Cl. ...................... 711/173; 711/172; 711/103; 707/205
(58) Field of Search ................................. 711/173, 153, 711/170, 171, 172, 103, 104, 129; 713/2; 709/104, 105; 707/205

(56) References Cited

U.S. PATENT DOCUMENTS

| 5,675,769 A | 10/1997 | Ruff et al. .................. 711/173 |
| 5,706,472 A | 1/1998 | Ruff et al. .................. 711/173 |
| 5,758,050 A | 5/1998 | Brady et al. .................. 714/1 |
| 5,819,061 A | 10/1998 | Glassen et al. ................. 709/1 |
| 5,860,082 A | 1/1999 | Smith et al. ................. 711/103 |

*Primary Examiner*—Matthew Kim
*Assistant Examiner*—Matthew D. Anderson
(74) *Attorney, Agent, or Firm*—Hamilton & Terrile, LLP; Stephen A. Terrile

(57) ABSTRACT

One embodiment of the present invention provides a system that supports resizing of file system partitions. The system includes one or more storage devices that are divided into a plurality of partitions, wherein each partition includes a different file system. The system operates by receiving a request to allocate storage within a partition. In response to the request, the system adds a request size to a current partition size to produce a predicted size for the partition. Next, the system compares the predicted size for the partition with a size limit for the partition. If the predicted size exceeds the size limit, the system signals an error condition. If the predicted size does not exceed the size limit, the system allocates the requested storage for the partition in the nonvolatile random access memory. The system also makes the current partition size equal to the predicted partition size. In a variation on the above embodiment, the system receives a request to deallocate storage from the partition. In response to the request, the system deallocates the storage, and decreases the current partition size to reflect the deallocated storage.

26 Claims, 5 Drawing Sheets

METHOD AND APPARATUS FOR SUPPORTING RESIZING OF FILE SYSTEM PARTITIONS

RELATED APPLICATION

The subject matter of this patent application is related to the subject matter in a copending non-provisional U.S. patent application entitled, "Storage System Server," having Ser. No. 09/276,428, and a filing date of Mar. 25, 1999. The instant application hereby incorporates by reference the above-listed application.

BACKGROUND

1. Field of the Invention

The present invention relates to the design of file systems for computers. More specifically, the present invention relates to a method and apparatus for supporting resizing of file system partitions.

2. Related Art

Computers use files for archival storage of code and data. Files are typically stored within a file system that is located within a partition on a non-volatile storage device, such as a magnetic disk drive or a magnetic tape drive. A partition comprises a set of contiguous sectors or storage locations in a storage device that are dedicated to a single file system. For example, a storage device, such as a disk drive, can be divided into a number of partitions, wherein each partition is dedicated to a different file system.

The use of partitions provides certain advantages. Partitions tend to group files from the same file system in close physical proximity to each other within a storage device. This tends to reduce the amount of rotational latency and seek time required to access files from the same file system, which can potentially improve computer system performance.

Additionally, partitions tends to insulate file systems from each other, thereby reducing undesired interactions between file systems. When file systems are located in separate partitions, it is unlikely that an erroneous write operation to a first file system located in a first partition will affect a second file system located in a second partition.

The use of partitions also creates a number of disadvantages. A major disadvantage is that it is hard to modify partitions after they have been established. Re-partitioning is often required because it is hard to predict how particular file systems will evolve over time. It is common for a first file system to run out of space in a first partition while a second partition has space available. This problem can be solved by repartitioning the storage device so that the more space is allocated to the first partition and less space is allocated to the second partition. Unfortunately, repartitioning requires all of the data on the storage device to be erased. Hence, all of the data from the storage device must first be copied onto a backup device such as a tape drive or another disk drive before repartitioning takes place. After the repartitioning is complete, the data must be reloaded into the partitions. This entire process can be a very time-consuming.

Furthermore, some file systems are beginning to be integrated into non-volatile semiconductor storage devices such as flash memory. In flash memory devices, storing related data in contiguous storage locations is no longer a great advantage because seek time and rotational latency time do not exist for flash memories. In fact, locating data in contiguous locations in flash memory can reduce opportunities for parallel access to multiple non-volatile memory modules. Hence, locating related file system data in proximate locations in flash memory can actually hinder file system performance.

Additionally, concentrating accesses on a small set of contiguous locations in a flash memory tends to wear out the flash memory because a given flash memory cell can typically be written only a limited number of times before it wears out.

What is needed is a system that allows file system partitions to be resized without the time-consuming process of backing up and restoring existing data within the partitions.

SUMMARY

One embodiment of the present invention provides a system that supports resizing of file system partitions. The system includes one or more storage devices that are divided into a plurality of partitions, wherein each partition includes a different file system. The system operates by receiving a request to allocate storage within a partition. In response to the request, the system adds a request size to a current partition size to produce a predicted size for the partition. Next, the system compares the predicted size for the partition with a size limit for the partition. If the predicted size exceeds the size limit, the system signals an error condition. If the predicted size does not exceed the size limit, the system allocates the requested storage for the partition in the nonvolatile random access memory. The system also makes the current partition size equal to the predicted partition size.

In a variation on the above embodiment, the system receives a request to deallocate storage from the partition. In response to the request, the system deallocates the storage, and decreases the current partition size to reflect the deallocated storage.

In one embodiment of the present invention, the request for storage is received as part of a write request or a file creation request.

In one embodiment of the present invention, the request to deallocate storage is received as part of a request to delete a file.

In one embodiment of the present invention, the non-volatile random access memory includes flash memory.

In one embodiment of the present invention, the system includes a global pool of storage containing storage that can be allocated to any partition in the plurality of partitions.

Another embodiment of the present invention includes a computer readable storage medium containing a data structure for supporting resizing of a file system partition. This data structure includes a maximum partition size, specifying a maximum size that a partition can grow to, as well as a current partition size, specifying a current size for the partition that is less than or equal to the maximum partition size. The data structure also includes a root directory pointer, that points to a root directory for the file system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computer System

Figure 1:
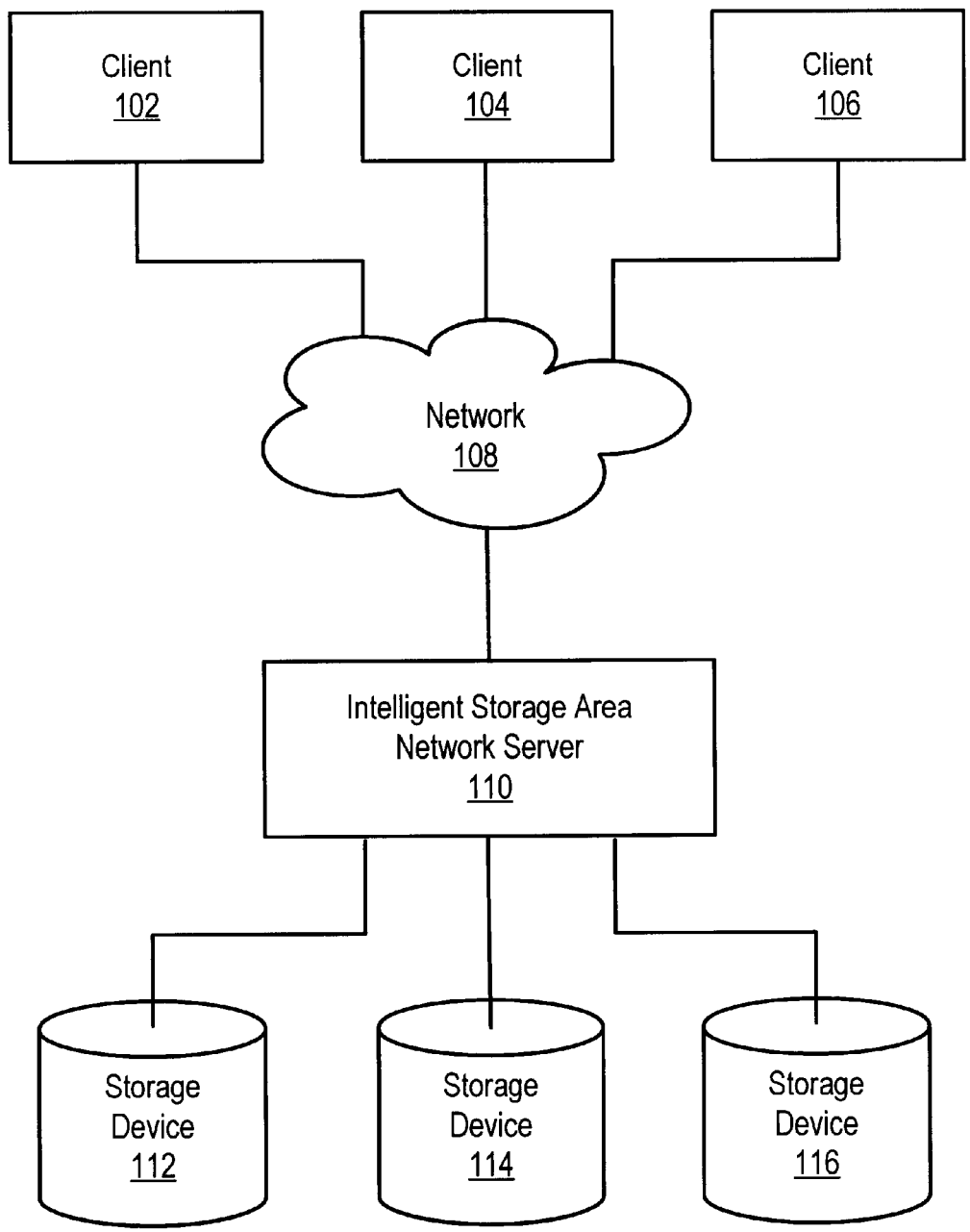
FIG. 1 illustrates a distributed computer system in accordance with an embodiment of the present invention.

FIG. 1 illustrates a distributed computer system in accordance with an embodiment of the present invention. The distributed computer system illustrated in FIG. 1 includes clients 102, 104 and 106. Clients 102, 104 and 106 are coupled to intelligent storage area network server (ISAN Server) 110 through network 108. ISAN server 110 is further coupled to storage devices 112, 114 and 116.

Clients 102, 104 and 106 may include any network device that makes requests on a server, such as ISAN server 110, for services involving computational or data storage resources.

In general, a server can include any device for servicing requests involving computational or data storage resources. In particular, ISAN server 110 services requests from clients 102, 104 and 106 for accesses to non-volatile storage resources distributed across a storage area network. ISAN server 110 and the storage area network are described in U.S. patent application Ser. No. 09/276,428 that has been incorporated by reference above. Some of the internal structures of ISAN server 110 are described below with reference to FIG. 3.

Network 108 can include any type of communication channel for carrying communications between ISAN server 110 and clients 102, 104 and 106. This includes, but is not limited to, local area networks, such as Ethernet, and wide area networks, such as the Internet. Network 108 may include a network that uses a fiber optic, electrical, infrared or radio wave communication mechanism.

In the embodiment of the present invention illustrated in FIG. 1, ISAN server 110 includes internal data storage capacity and is also coupled to storage devices 112, 114 and 116, which provide additional storage capacity. Storage devices 112, 114 and 116 may include any type of storage devices that can store code and/or data. This includes, but is not limited to, semiconductor memory devices, magnetic storage devices, optical storage devices, and magneto-optical storage devices. In one embodiment of the present invention, storage devices 112, 114 and 116 include disk drives.

Intelligent Storage Area Network Server

Figure 2:
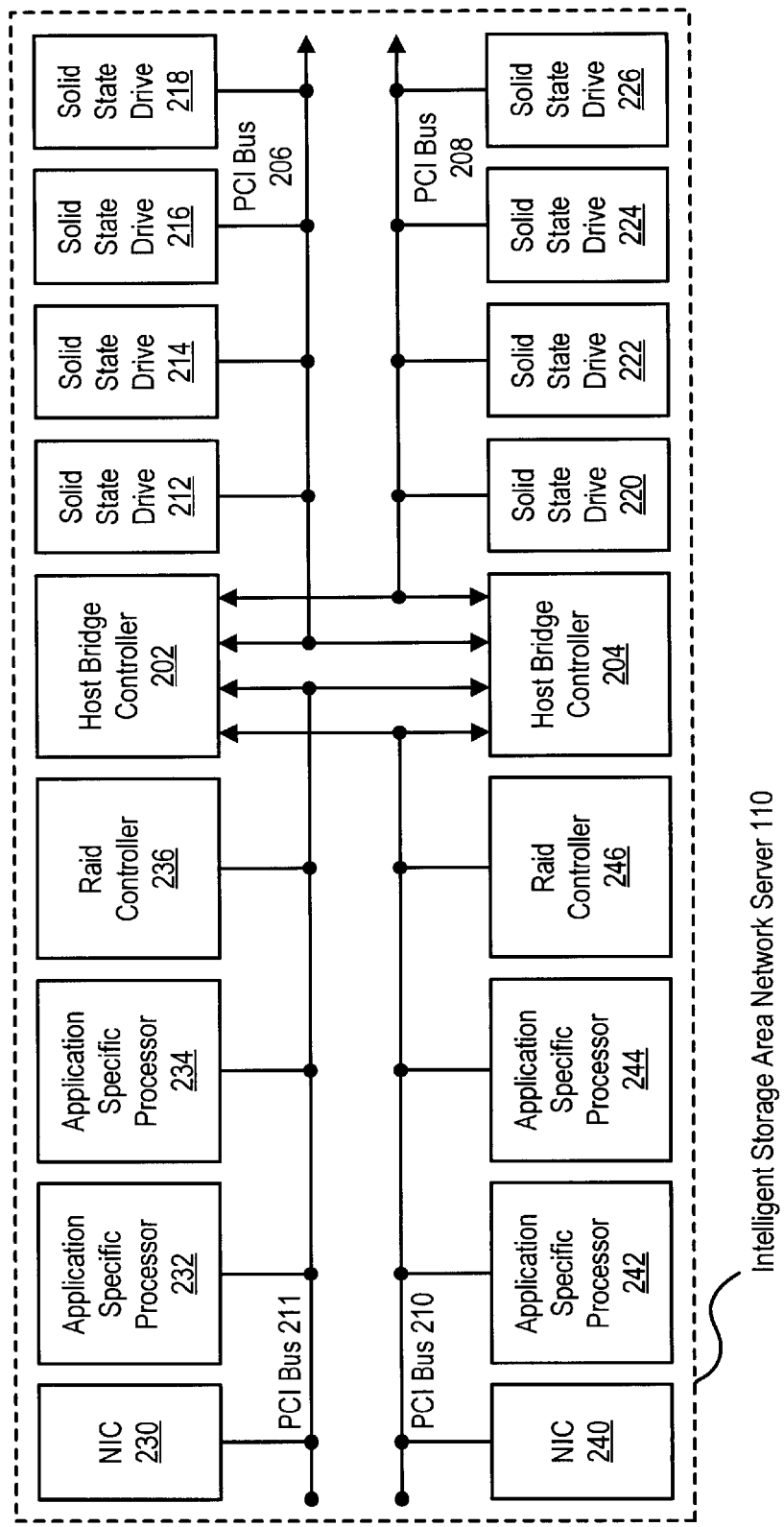
FIG. 2 illustrates the internal structure of an intelligent storage area network server in accordance with an embodiment of the present invention.

FIG. 2 illustrates part of the internal structure of ISAN server 110 in accordance with an embodiment of the present invention. The internal structure of ISAN server 110 is described in more detail in U.S. patent application Ser. No. 09/276,428, which has been incorporated by reference above. ISAN server 110 includes four PCI busses 206, 208, 210 and 211, which are coupled to various interfaces and storage devices. More specifically, PCI bus 206 is coupled to solid state storage drives 212, 214, 216 and 218. PCI bus 208 is coupled to solid state storage drives 220, 222, 224 and 226. PCI bus 208 is coupled to NIC 230, application specific processor 232, application specific processor 234 and redundant arrays of inexpensive disks (RAID) controller 236. PCI bus 210 is coupled to NIC 240, application specific processor 242, application specific processor 244 and RAID controller 246.

Solid state storage drives 212, 214, 218, 220, 222, 224 and 226 can include any type of storage devices containing non-volatile semiconductor memory. In one embodiment of the present invention, solid state storage drives 212, 214, 218, 220, 222, 224 and 226 contain flash memory.

Note that the upper PCI busses (206 and 211) and lower PCI busses (208 and 210) are configured to provide redundant services. More specifically, upper PCI bus 206 has the same configuration as lower PCI bus 208, and upper PCI bus 211 has the same configuration as lower PCI bus 210.

PCI busses 206, 208, 210 and 211 are coupled to host bridge controllers 202 and 204. Host bridge controllers 202 and 204 each span PCI busses 206, 208, 210 and 211 and thereby provide redundant bridging paths between PCI busses 206, 208, 210 and 211.

Mirrored Architecture

Figure 3:
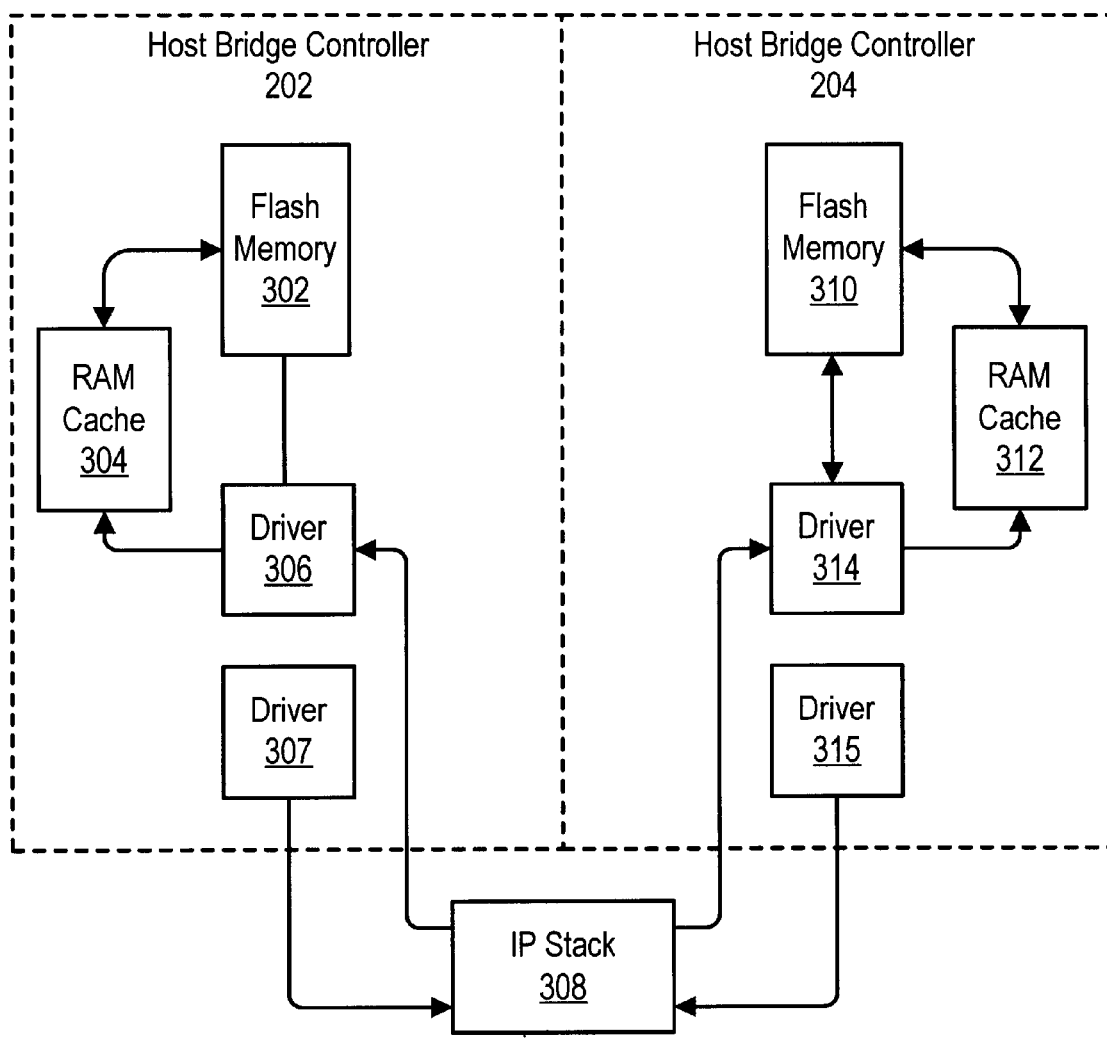
FIG. 3 illustrates a mirrored architecture including two host bridge controllers in accordance with an embodiment of the present invention.

FIG. 3 illustrates a mirrored architecture including host bridge controllers 202 and 204 in accordance with an embodiment of the present invention. Recall that host bridge controllers 202 and 204 provide redundancy so that if one fails the other can take over. In order to accomplish this, host bridge controllers 202 and 204 must remain consistent with each other. To this end, host bridge controller 202 includes flash memory 302, which is kept consistent with flash memory 310 in and host bridge controller 204. In one embodiment of the present invention, flash memories 302 and 310 each include 128 megabytes of flash memory. Note that in general the system can use any type of non-volatile semiconductor storage in place of flash memories 302 and 310.

Host bridge controller 202 includes driver 306, which performs read requests, write requests and status requests for accesses to flash memory 302. Driver 306 also maintains a table that maps a logical continuous space onto the good parts of flash memory 302. Recall that flash memory tends to wear out as it is used. Hence, "bad spots" tend to appear over time.

RAM cache 304 is used to manage bad spot information for flash memory 302. RAM cache 304 is also used to cache data during write operations. In flash memory devices, the granularity of a write operation is typically finer than the granularity of an erase operation. Hence, in order to write to a location in flash memory 302, the system pulls a surrounding block of memory into RAM cache 304 before erasing the block in flash memory 302. Next, the block is modified in RAM cache 304 before being written back to flash memory 302.

Note that host bridge controller 204 similarly includes driver 314 and RAM cache 312 to perform the same functions as driver 306 and RAM cache 304 in host bridge controller 202.

Host bridge controller 202 also includes driver 307, which provides a remote interface through IP stack 308 to flash memory 310 in host bridge controller 204. Similarly, host bridge controller 204 includes driver 315, which provides a remote interface through IP stack 308 to flash memory 302 in host bridge controller 202.

File System Data Structures

Figure 4:
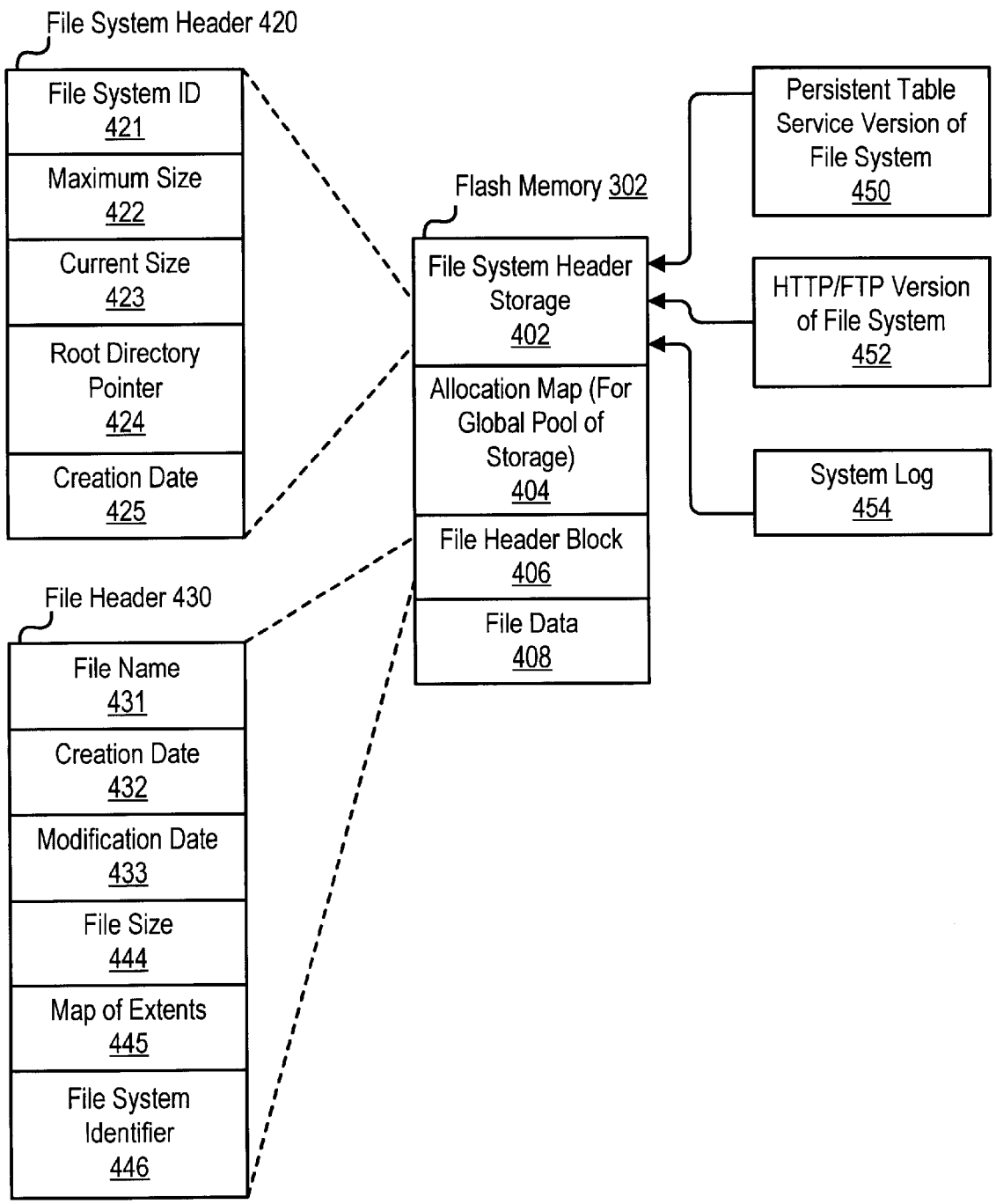
FIG. 4 illustrates data structures for implementing a plurality of file systems in accordance with an embodiment of the present invention.

FIG. 4 illustrates data structures for implementing a plurality of file systems in accordance with an embodiment of the present invention. These data structures reside within flash memory 302 in host bridge controller 202. Flash memory 302 includes file system header storage 402, allocation map 404, file header block 406 and file data 408.

File data 408 includes blocks of data that are used by files within file systems for storing data.

File system header storage 402 includes a plurality of file system headers (also referred to as partition descriptors). A file system header includes information describing a file system and a related partition. For example, as illustrated in FIG. 4, file system header 420 includes file system ID 421, maximum size 422, current size 423, root directory pointer 424 and creation date 425. File system ID 421 is a unique identifier for the file system. Maximum size 422 includes a value indicating a maximum possible size for the file system (partition). Current size 423 is a variable containing the current size of the file system. Root directory pointer 424 contains a pointer to an indexing structure for the file system. In some file systems, this indexing structure is a hierarchical directory structure. In other file systems, this indexing structure is a simple file map. In file systems that contain only a single file, such as system log 454, root directory pointer 424 points directly to the single file. Finally, creation date 425 includes a creation date for the file system. Note that there exists one file system header for each file system and associated partition in flash memory 302.

Allocation map 404 includes information specifying which blocks of memory have been allocated from a global pool of storage that is available to all partitions in the system. In one embodiment of the present invention, allocation map 404 is a bitmap wherein each bit represents a block within flash memory 302.

File header block 406 includes a plurality of file header blocks containing information related to individual files. For example, file header 430 includes file name 431, creation date 432, modification date 433, file size 444, map of extents 445 and file system identifier 446. File name 431 serves as an identifier for the file. Creation date 432, modification date 433 and file size 444 are common file system attributes. Map of extents 445 lists the locations of extents in which file data is stored. File system identifier 446 identifies the file system that the file is associated with.

One embodiment of the present invention supports three separate instances of a file system in different partitions. A persistent table service version of the file system 450 is used by a persistent table service to store a large number of tables. A HTTP/FTP version of the file system 452 permits access to the file system by remote users. In doing so, it insulates the other file systems from actions of remote users. System log 454 records various transactions involved in operating the computer system. Note that system log 454 includes only a single file. Hence, system log 454 does not use any directory structure.

Allocation and Deallocation Process

Figure 5:
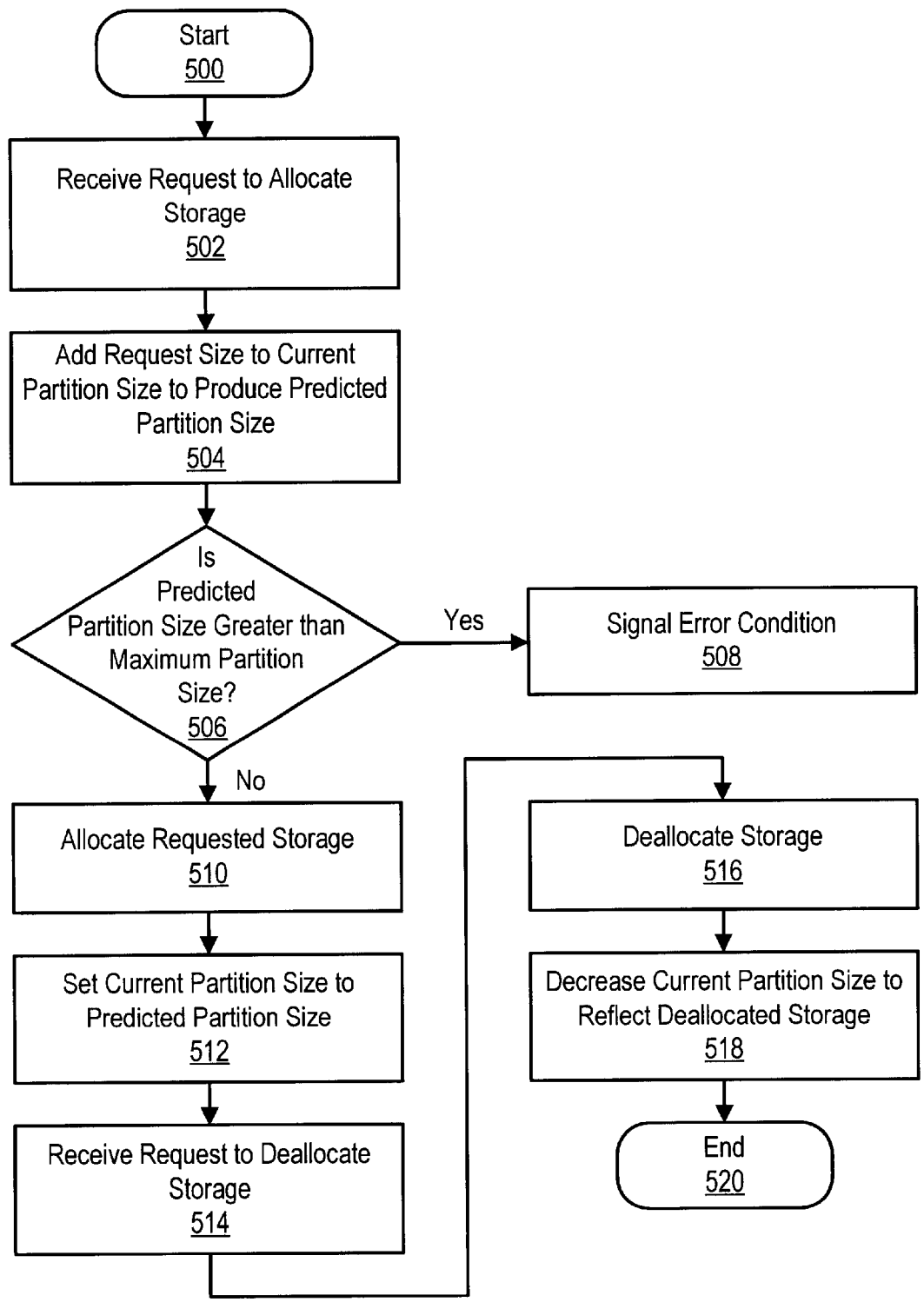
FIG. 5 is a flow chart illustrating the process of allocating and deallocating storage from a partition in accordance with an embodiment of the present invention.

FIG. 5 is a flow chart illustrating the process of allocating and deallocating storage from a partition in accordance with an embodiment of the present invention. The system first receives a request to allocate storage in a file system (step 502). This request may be received during a number of different file system operations, including a file system create operation or a file system write operation. Next, the system adds the request size to a current partition size, such as current size 423 in FIG. 4, to produce a predicted partition size (step 504). The system compares the predicted partition size with a maximum partition size, such as maximum size 422 in FIG. 4 (step 506). If the predicted size is greater than the maximum size, the system signals an error condition which causes the requested file system operation to return with an error code (step 508). Otherwise, the system allocates the requested storage (step 510) and sets the current partition size to be the predicted partition size (step 512).

Next, the system receives a request to deallocate storage (step 514). This request may be received during a number of different file system operations, including for example a file delete operation. In response to the request to deallocate storage, the system deallocates the specified storage (step 516) and decreases the current partition size to reflect the fact that storage has been deallocated.

Note that although the present invention is described in a context relating to an intelligent server in a distributed computer system with non-volatile random access memory storage, the present invention can generally be applied in any computer system that contains multiple file systems residing in different partitions. This includes non-distributed centralized computer systems and computer systems using conventional disc storage devices.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for supporting resizing of file system partitions within a storage system, the storage system being divided into a plurality of partitions, each partition including a different file system, the method comprising:

receiving a request to allocate storage within a partition from the plurality of partitions;

adding a request size for the request to a current partition size to produce a predicted size for the partition;

comparing the predicted size for the partition with a size limit for the partition;

if the predicted size exceeds the size limit, signaling an error condition; and if the predicted size does not exceed the size limit, allocating the requested storage for the partition in the storage system, and making the current partition size equal to the predicted partition size.

2. The method of claim 1, further comprising receiving a request to deallocate storage from the partition, and in response to the request:

deallocating the storage; and decreasing the current partition size to reflect the deallocated storage.

3. The method of claim 2, wherein the request to deallocate storage is receiving as part of a request to delete a file.

4. The method of claim 1, wherein the request for storage is part of a write request to a file.

5. The method of claim 1, wherein the request for storage is part of a file creating request.

6. The method of claim 1, wherein allocating the requested storage includes allocating the requested storage in a nonvolatile semiconductor memory storage device.

7. The method of claim 1, wherein allocating the requested storage includes allocating the requested storage in a flash memory.

8. The method of claim 1, wherein the plurality of partitions contain a plurality of file systems with a plurality of differing file system architectures.

9. The method of claim 1, wherein the partition includes a file system containing tables of a computer system configuration information.

10. The method of claim 1, wherein the partition includes a file system containing computer system boot information.

11. The method of claim 1, wherein the partition includes a file system containing a computer system log.

12. The method of claim 1, wherein allocating the requested storage for the partition includes allocating the requested storage from a global pool of storage, the global pool of storage containing storage that can be allocated to any partition in the plurality of partitions.

13. An apparatus for supporting the resizing of file system partitions, comprising:
   a storage system that is divided into a plurality of partitions, each partition including a different file system;
   an allocation mechanism that receives a request to allocate storage within a partition from the plurality of partitions;
   a comparison mechanism that is configured to add a request size for the request to a current partition size to produce a predicted size for the partition, and to compare the predicted size for the partition with a size limit for the partition;
   wherein if the predicted size does not exceed the size limit, the allocation mechanism is configured to, allocate the requested storage for the partition, and to make the current partition size equal to the predicted partition size; and
   an error signaling mechanism that signals an error condition if the predicted size exceeds the size limit.

14. The apparatus of claim 13, further comprising a deallocation mechanism that is configured to receive a request to deallocate storage from the partition, and in response to the request is configured to:
   deallocating the storage; and
   decrease the current partition size to reflect the deallocated storage.

15. The apparatus of claim 14, wherein the request to deallocate storage is part of a request to delete a file.

16. The apparatus of claim 13, wherein the request for storage is part of a write request to a file.

17. The apparatus of claim 13, wherein the request for storage is part of a file creation request.

18. The apparatus of claim 13, wherein the storage system includes flash memory.

19. The apparatus of claim 13, wherein the storage system includes nonvolatile random access memory.

20. The apparatus of claim 13, wherein the plurality of partitions contain a plurality of file systems with a plurality of differing file system architectures.

21. The apparatus of claim 13, wherein the partition includes a file system containing tables of computer system configuration information.

22. The apparatus of claim 13, wherein the partition includes a file system containing computer system boot information.

23. The apparatus of claim 13, wherein the partition includes a file system containing a computer system log.

24. The apparatus of claim 13, further comprising a global pool of storage, the global pool of storage containing storage that can be allocated by the allocation mechanism to any partition in the plurality of partitions.

25. A computer readable storage medium storing instructions that when executed by a computer cause the computer to perform a method for supporting resizing of file system partitions within a storage system, the storage system being divided into a plurality of partitions, each partition including a different file system, the method comprising:
   receiving a request to allocate storage within a partition from the plurality of partitions;
   adding a request size for the request to a current partition size to produce a predicted size for the partition;
   comparing the predicted size for the partition with a size limit for the partition;
   if the predicted size exceeds the size limit, signaling an error condition; and
   if the predicted size does not exceed the size limit, allocating the requested storage for the partition in the storage system, and making the current partition size equal to the predicted partition size.

26. A computer readable storage medium of claim 25, wherein the method further comprises, receiving a request to deallocate storage from the partition, and in response to the request:
   deallocating the storage; and
   decreasing the current partition size to reflect the deallocated storage.

* * * * *